(12) United States Patent
Yoshida et al.

(10) Patent No.: US 7,721,652 B2
(45) Date of Patent: May 25, 2010

(54) GAS GENERATOR

(75) Inventors: Masahiro Yoshida, Himeji (JP); Shigeru Maeda, Himeji (JP); Makoto Iwasaki, Himeji (JP); Ryoi Kodama, Himeji (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 788 days.

(21) Appl. No.: 10/591,007

(22) PCT Filed: Mar. 1, 2005

(86) PCT No.: PCT/JP2005/003391

§ 371 (c)(1), (2), (4) Date: Jan. 16, 2007

(87) PCT Pub. No.: WO2005/082511

PCT Pub. Date: Sep. 9, 2005

(65) Prior Publication Data

US 2008/0156216 A1    Jul. 3, 2008

(30) Foreign Application Priority Data

Mar. 2, 2004 (JP) ............................ 2004-057295
Mar. 3, 2004 (JP) ............................ 2004-059496

(51) Int. Cl.
*F42B 3/12* (2006.01)
*C06D 5/00* (2006.01)

(52) U.S. Cl. .................. 102/530; 102/202.71

(58) Field of Classification Search .............. 102/530, 102/531, 202.5, 202.7, 202.9, 202.12, 202.14
See application file for complete search history.

(56) References Cited

U.S. PATENT DOCUMENTS

| 4,976,200 | A | * | 12/1990 | Benson et al. | ........... 102/202.7 |
| 5,029,529 | A | | 7/1991 | Mandigo et al. | |
| 5,732,634 | A | | 3/1998 | Flickinger et al. | |
| 5,992,326 | A | * | 11/1999 | Martinez-Tovar et al. | 102/202.4 |
| 6,199,484 | B1 | * | 3/2001 | Martinez-Tovar et al. | 102/202.4 |

(Continued)

FOREIGN PATENT DOCUMENTS

| JP | 8 253100 | 10/1996 |
| JP | 11 292678 | 10/1999 |
| JP | 2000 203372 | 7/2000 |
| WO | 01 74633 | 10/2001 |
| WO | 02 062629 | 8/2002 |

*Primary Examiner*—James S Bergin
(74) *Attorney, Agent, or Firm*—Oblon, Spivak, McClelland, Maier & Neustadt, L.L.P.

(57) ABSTRACT

A gas generator including a plug (24) having a header part (45) and two or more electrode pins (22, 23), a thin-film bridge (25) having electrode pads (41, 42), and a squib (10) in which upon supply of electric current to the thin-film bridge (25) via the electrode pins (22, 23), the thin-film bridge (25) is activated to ignite ignition materials (26, 27), wherein the thin-film bridge (25) is arranged into a hollow (32) prepared at the plug (24) in such a manner that the thin-film bridge (25) is kept approximately on a level with the head (35) of the electrode pins (22, 23) and the header part (45) of the plug (24), the thin-film bridge (25) is connected by wire bonding to the electrode pins (22, 23) at the electrode pad parts (41, 42), and at least either of the electrode pad (41) or (42) of the thin-film bridge (25) is connected by the wire bonding to a metal part of the header part (45) of the plug (24).

16 Claims, 7 Drawing Sheets

U.S. PATENT DOCUMENTS

| | | | |
|---|---|---|---|
| 6,289,813 B1 * | 9/2001 | Duguet et al. | 102/202.5 |
| 6,324,979 B1 | 12/2001 | Troianello | |
| 6,327,978 B1 * | 12/2001 | Turano et al. | 102/202.7 |
| 6,640,718 B2 * | 11/2003 | Duguet et al. | 102/202.5 |
| 6,758,922 B2 * | 7/2004 | Hamilton | 149/75 |
| 6,880,233 B2 * | 4/2005 | Gerber et al. | 29/619 |
| 2002/0069780 A1 * | 6/2002 | Bos | 102/202.7 |
| 2002/0096078 A1 * | 7/2002 | Goosen et al. | 102/202.5 |

* cited by examiner

GAS GENERATOR

TECHNICAL FIELD

The present invention relates to a gas generator suitable for inflating an airbag for side impact, a curtain airbag and the like.

BACKGROUND ART

An airbag is known as a safety system for protecting a passenger from an impact resulting from a collision of an automobile. The airbag is activated by a large quantity of a high-temperature and high-pressure gas generated by a gas generator. Conventionally, gas is generated by gas generators according to two roughly-categorized methods. One is a pyro inflator method in which all gases are generated by burning solid gas generants (for example, refer to Patent Document 1). The other is a hybrid inflator method in which a gas cylinder containing a high pressure gas and a small quantity of explosive compositions for supplying heat to a high pressure gas in the gas cylinder are used to discharge a large quantity of a high pressure gas (for example, refer to Patent Document 4).

Where gas generant compositions include low reactive materials such as guanidine derivatives and ammonium nitrate as its compositions, there poses a problem that the gas generants are low in ignitability, in addition to a slow burning velocity. An airbag takes 10 to 60 ms from the time when a gas generator is activated to the time when the airbag is deployed. Therefore, only a slight delay in activation of the gas generator will give such a serious impact that the airbag cannot exhibit a sufficient performance. Gas generants, which are low in ignitability, will take a longer time to ignite on a squib inside the gas generator, resulting in a delayed ignition of the gas generator. An increased quantity of a propellant inside the gas generator will improve the delayed ignition to some extent. However, the thus increased quantity of the propellant will lead to an increase in total calorific value of the gas generator itself, which consequently increases the weight of a filter member for cooling the gas and makes the gas generator larger in size.

Further, a gas generator using the pyro inflator method for inflating an airbag for side impact and a curtain airbag is mainly an elongated cylindrical housing, as disclosed in Patent Document 2, and structured in such a manner that both ends are sealed by welding. Therefore, where the gas generant disclosed in Patent Document 1 is used, the gas generator must burn the gas generant at a higher pressure in order to obtain a sufficient burning performance, and a housing must be thicker in order to improve the pressure resistance of the housing. Where a propellant is used in a larger quantity to improve the ignitability, a filter member must be larger to give a sufficient cooling to the gas, because of an increased calorific value. Under these circumstances, conventional gas generators have not been made smaller in size or lighter in weight.

Further, Patent Document 3 has disclosed a gas generator according to the pyro inflator method in which a seal member such as an O-ring is provided on an outer peripheral end surface of a partition member in order to seal reliably a housing and the partition member. However, this gas generator needs a process for notching the outer peripheral end surface of the partition member to provide the seal member such as the O-ring, thereby increasing a cost of manufacturing the gas generator, which poses a problem. In addition, in the gas generator, the partition member does not divide a filter chamber and a combustion chamber.

In contrast, a gas generator according to the hybrid inflator method has a smaller quantity of gas generants and is suitable for making the generator small in size. However, since the gas generator must keep a high pressure gas in a gas cylinder, the high pressure gas may escape from the gas cylinder in the course of as long as 15-year life period as a gas generator, thereby resulting in a failure of providing a sufficient effect, where sealing is insufficient. For this reason, for sealing the gas in the gas cylinder for a longer time, which makes it necessary to seal the gas cylinder by using higher in breaking strength and a highly-sealable rupture disk. This type of gas generator is disclosed in Patent Document 4, for example. In order to increase the gas sealability of a first container (gas cylinder) in which a high pressure gas is sealed, a rupture diaphragm (rupture disk) having a high breaking strength is used in the gas generator, and a hollow piston provided in a second container having a combustion chamber, etc., is allowed to advance into the rupture diaphragm by ignition of a driving insert (squib), thereby rupturing a rupture diaphragm of the first container without fail and also reliably discharging a high pressure gas in the first container. This structure is able to rupture the rupture diaphragm without fail but requires a hollow piston or the like, thereby making the gas generator structurally complicated, which also poses a problem.

There is also available a gas generator in which rupture of a rupture disk for reliably sealing a gas cylinder is conducted not by using a hollow piston or the like as disclosed in Patent Document 4 but by increasing a quantity of a propellant to elevate the pressure inside a combustion chamber including a squib. However, an increased quantity of the propellant requires a chamber for accommodating the propellant, thereby making it difficult to miniaturize the gas generator. Further, in this instance, it is difficult to rupture the rupture disk simultaneously with ignition of the squib.

Further, in this type of gas generator, a high pressure gas inside a gas cylinder undergoes an adiabatic expansion to spout from the gas cylinder, thereby making it necessary to heat and discharge the gas. This generator is unable to sufficiently heat the gas from the gas cylinder, which poses another problem.

Still further, Patent Document 5 has disclosed a gas generator according to the hybrid inflator method in which a gas cylinder for retaining a high pressure gas and a small quantity of explosive compositions for supplying heat to the high pressure gas inside the gas cylinder are used to discharge a great quantity of a high temperature and high pressure gas.

In addition, Patent Document 6 has disclosed a squib used in these gas generators in which a thin-film bridge formed on a substrate of ceramics or the like is fixed to a plug by using epoxy resin, polyimide, ceramics and others. This thin-film bridge is electrically connected to an electrode pin provided on a plug by soldering or wire bonding or by using an electric-conductive epoxy resin or the like. A squib having the thin-film bridge is advantageous in that the ignition time is reduced to several times or more than a dozen times, as compared with that having a bridge wire. However, where the squib is connected with an electric-conductive epoxy resin and used in a gas generator for an automobile, it is exposed to a high-temperature environment on blazingly hot days in summer, which may result in a change in resistance value of the electric-conductive epoxy resin. Further, the resistance value is easily affected by the surface condition of an electrode even at an initial stage of assembly, resulting in a great variance in initial resistance value, which poses a problem. Wire bonding will solve the problems caused by soldering or by the use of an electric conductive epoxy resin, however, in the squib disclosed in Patent Document 6, a thin-film bridge is fixed in a state that it is projected on a plug. Therefore, a wire may be broken where a pressing force is applied upon insertion of the plug having the projected thin-film bridge into an ignition-charge loading cap. The possibility may be higher particularly where, as disclosed in Patent Document 6, the wire is erected to joint on the end surface, which is a so-called vertical joint.

[Patent Document 1] Japanese Unexamined Patent Published No. 11-292678

[Patent Document 2] Japanese Unexamined Patent Published No. 2000-203372

[Patent Document 3] International Publication WO No. 01/74633, booklet

[Patent Document 4] Japanese Unexamined Patent Published No. 8-253100

[Patent Document 5] International Publication WO No. 02/062629, booklet

[Patent Document 6] U.S. Pat. No. 6,324,979B1 Specification

DISCLOSURE OF THE INVENTION

Problems to be Solved by the Invention

An object of the present invention is to provide a gas generator which is capable of inflating an airbag in a shorter time and also smaller in size, simpler in structure and higher in reliability than a conventional gas generator.

Means for Solving the Problem

A gas generator of the present invention is comprised of a squib having a plug having a header part and two or more electrode pins, and a thin-film bridge having an electrode pad. The squib upon supply of an electric current to the thin-film bridge via the electrode pins, the thin-film bridge is activated to ignite an ignition charge. The thin-film bridge is fixed by arranging into a hollow prepared at the plug in such a manner that the surface is kept approximately on a level with the head of the electrode pin and the surface of the header part of the plug, the thin-film bridge is connected by wire bonding to the electrode pins at the electrode pad part, and at least one of the electrode pads in the thin-film bridge is electrically connected by the wire bonding to a metal part of the header part of the plug.

It is preferable that the gas generator of the present invention is additionally comprised of a housing having a combustion chamber in which gas generants for generating a high temperature gas by burning are sealed and a filter chamber for attaching a filter member is placed, wherein the gas generants inside the combustion chamber are ignited and burnt by the squib.

It is preferable that in the gas generator of the present invention, the housing is 30 mm or less in an outer diameter and the squib is attached at the end of the housing.

It is also preferable that in the gas generator of the present invention, the housing is in a closed-end cylindrical shape, which is opened at the one end and closed at the other end.

The gas generator of the present invention is preferably provided with a first partition member, which divides the combustion chamber and the filter chamber.

In the gas generator of the present invention, the other end of the housing is preferably in a bowl shape or in a flat-bottomed shape.

Further, it is preferable that in the gas generator of the present invention, a propellant is sealed inside the combustion chamber.

It is preferable that in the gas generator of the present invention, the gas generants and the propellant are not placed in a container but directly sealed into the combustion chamber, and the gas generants and the propellant are divided by a second partition member.

It is preferable that in the gas generator of the present invention, the first partition member is inserted into a predetermined position inside the housing and a peripheral surface of the housing is crimped in a diametrically contracting direction to joint and fix an end surface of the first partition member.

It is preferable that the gas generator of the present invention is provided with a gas cylinder in which a compressed gas is contained, a housing in which a propellant and the squib is housed and also an outer cylindrical member connecting and holding the gas cylinder and the housing, wherein the gas cylinder has a rupture disk which maintains the pressure and seals a compressed gas at the end of it facing the housing, the outer cylindrical member has a filter member provided along the inner periphery and a gas retaining space is provided between the gas cylinder and the housing inside the outer cylindrical member.

It is preferable that in the gas generator of the present invention, the gas cylinder is from 20 to 30 mm in outer diameter.

It is preferable that in the gas generator of the present invention, the rupture disk is ruptured by a flame power generated from the squib.

It is preferable that in the gas generator of the present invention, a plurality of second flame discharging openings toward the outer cylindrical member are formed at the side cylindrical part on bottom of the housing.

It is preferable that in the gas generator of the present invention, the surface of the electrode pad is made of any one of gold, aluminum, nickel or titanium.

It is preferable that in the gas generator of the present invention, a wire used in the wire bonding is made of gold or aluminum and the wire is from 10 μm to 500 μm in diameter.

It is preferable that in the gas generator of the present invention, the wire used in the wire bonding is 1 mm or less in loop height.

EFFECTS OF THE INVENTION

The above-described gas generator is capable of igniting an ignition material stably at a high-speed but low energy by using a squib in which a thin-film bridge is buried into a plug in such a manner that the surface of the thin-film bridge is kept approximately on a level with the head of the electrode pin and the surface of the header part of the plug.

Further, since a gas generator equipped with a squib including a thin-film bridge of the present invention is simple in structure, it can be made small in size and also manufactured at a low cost.

Still further, a gas generator according to the pyro inflator method, which is equipped with a squib including a thin-film bridge of the present invention, is capable of inflating an airbag faster than a conventional counterpart, when used in an airbag for side impact.

In addition, a gas generator according to the hybrid inflator method, which is equipped with a squib including a thin-film bridge of the present invention, is more prominently effective in inflating and deploying an airbag in a shorter time, which is characteristic of the hybrid inflator method.

In a side collision of vehicles, an impact absorbing part, which is called a crush zone, is smaller and a distance between a passenger and an interior trim is shorter than in a front collision. Therefore, an airbag for side impact and a curtain airbag must be deployed more instantaneously than an airbag for dealing with a front collision and deployed before the passenger contacts with the interior trim. Thus, a gas generator for a side collision must be instantaneously activated in response to an electrical activating signal from an ECU (electronic control unit) which detects the side collision. The present invention has been made for satisfying the above requirement, in which a thin-film bridge is used in a resistance heating element of a squib, thereby making it possible to reduce an ignition time several times or more than a dozen times, as compared with a conventional bridge wire. However, a squib using a conventional thin-film bridge has problems on electrical connections, as described above. The invention has solved the problems by keeping the bridge surface of the thin-film bridge on a level with the surface of a header part of a plug and also has provided an electrostatic measure by electrically connecting an electrode pad of the thin-film bridge with a metal part of the header part of the plug.

BEST MODE FOR CARRYING OUT THE INVENTION

An explanation will be made for an example of the first embodiment of the gas generator according to the present invention with reference to drawings. FIG. 1 is a cross-sectional view showing an example of one embodiment of a gas generator according to the present invention. In FIG. 1, a gas generator 1 is a gas generator according to a so-called pyro inflator method, provided with a housing 4, a first partition member 9 which divides the inside of the housing 4 into a combustion chamber 6 which seals gas generants 5 for generating a high temperature gas by burning and a filter chamber 8 to which a filter member 7 is attached, and a squib 10 which ignites and burns the gas generants 5 inside the combustion chamber 6, in which the housing 4 is in a closed-end cylindrical shape, which is opened at the one end 3 and closed at the other end 2.

An outer container of a conventional gas generator is constituted with a total of five parts, namely, three parts consisting of a housing, a lid on the one end and a lid on the other end, and a sealant (O-ring or the like) on the one end and that on the other end. However, the gas generator 1 of the present embodiment is constituted with three parts because the housing 4, which is in a closed-end cylindrical shape, does not require a lid on the other end and a sealant on the other end, thereby making it possible to decrease the number of parts. Further, a decreased number of parts will lead to a reduction in assembly processes and also lead to a reduction in manufacturing cost. In addition, the gas generator 1 can be made smaller in size. The cylindrical housing 4 is preferably 30 mm or less in outer diameter B and more preferably in the range from 20 mm or more to 30 mm or less. The housing 4 is preferably in a closed-end cylindrical shape.

The other end 2 of the housing 4 may be available, for example, in a rounded shape, a rectangular shape, a bowl shape, a flat-bottomed shape or the like. The housing illustrated in FIG. 1 is in a bowl shape. Therefore, the housing is prevented from deformation, even on elevation of the pressure inside the housing. Since the other end 2 is closed as described above, sealing only the end 3 may be sufficient. Further, since the number of parts can be decreased and only one part, namely, the one end 3 may be sealed, the gas generator 1 can be increased in safety and also made smaller in size. In addition, the housing 4 is preferably in the range from 1.9 to 20.0 in the ratio of the thickness of the cylindrical part to the outer diameter and more preferably from 3 to 16.0. It is noted that the housing 4 is formed with a metal such as stainless steel, iron or the like.

A gas discharge opening 11 is provided on an outer periphery of the other end 2 side of the housing 4. The gas discharge opening 11 is preferably provided at a site where no driving force is given to an inflator upon discharge of gas, for example, at a cylindrical part 20 of a filter chamber 8. Further, a plurality of the openings may be provided, or they may be provided not only in one line but in plural lines axially. Where provided in plural lines axially, they may be provided in a zigzag manner. The openings are preferably provided in 4 or 8 and more preferably in 4 at every 90 degrees on the same outer periphery or in 8 at every 90 degrees on two-lined outer peripheries. A high temperature and high pressure gas generated by burning of gas generants 5 inside a combustion chamber 6 is cooled, filtered and discharged from these gas discharge openings 11 via a filter member 7 attached to the filter chamber 8.

A first partition member 9 is in an annular flat circular-disk shape and provided with an opening 18, dividing an inner space of the housing 4 into a filter chamber 8 and a combustion chamber 6 (gas generant chamber) so as to give a two-chamber structure, thereby preventing damage (fusion) of the filter member 7 resulting from combustion heat of the gas generants 5. The first partition member 9 is made, for example, with stainless steel, iron or the like.

A seal member 16, for example, an aluminum tape or the like, is attached either or both at a site which is at an inner periphery side of the housing 4 and covering the gas discharge openings 11 and at a site covering the opening 18 of the first partition member 9. The seal member 16 is to seal a combustion chamber 6 inside the housing 4. It is more preferable that the seal member 16 is attached solely on the surface of the combustion chamber 6 side of the first partition member 9. The diameter of the seal member 16 may be greater by 4 mm or more than that of the opening 18. Adhesion to the first partition member 9 is simple and convenient and can contribute to a reduction in manufacturing cost of the gas generator.

A holder 12 for holding a squib 10 is attached at the one end 3 of the housing 4. The holder 12 is held by being crimped together with an end peripheral wall 13 of the housing 4, thereby closing the one end 3 of the housing 4.

Further, it is preferable that the peripheral surface of the housing 4 around a site where the first partition member 9 is placed is crimped in a diametrically contracting direction, by which an outer peripheral end surface of the first partition member 9 is allowed to bury into an inner peripheral surface of the housing 4. Thereby, a conventional process of notching an outer peripheral end surface of the partitioning member to attach a sealing member such as an O-ring or the like is eliminated to fix the first partition member 9 with the housing 4 reliably and at a lower cost, thereby making it possible to provide a highly sealable gas generator 1.

As illustrated in FIG. 2, the squib 10 is provided with a plug 24 having a pair of mutually insulated electrode pins 22 and 23 and a thin-film bridge 25 to be attached to the plug 24. The squid 10 is structured in such a manner that electric current is supplied via the electrode pins 22 and 23 to the thin-film bridge 25 to activate the thin-film bridge 25, thereby igniting ignition materials 26 and 27 loaded into a first tubular member 29.

The plug 24 is made of a metal such as stainless steel, aluminum, copper, iron or the like. Further, a pair of the electrode pins 22 and 23 extending from the plug 24 are also made of a metal such as stainless steel, aluminum, copper, iron or the like, as with the plug 24. And, these electrode pins 22 and 23 are covered at the periphery with an insulator 31 such as glass, resin or the like inside the plug 24, and mutually insulated. In addition, these electrode pins 22 and 23 are provided in such a manner that the head 35 is kept approximately on a level with the surface 45 of the header part in the plug 24.

FIG. 3 is an enlarged plan view indicated by the arrow C showing a part at which a thin-film bridge 25 in FIG. 2 is buried into a hollow 32 of the plug 24. FIG. 4 is a view showing the cross section taken along line A-A' in FIG. 3. FIG. 5 is a view showing the cross-section taken along line B-B' in FIG. 3.

As illustrated in FIG. 3, FIG. 4 and FIG. 5, the thin-film bridge 25 is buried into the hollow 32 formed in the plug 24 and provided in such a manner that the surface is kept approximately on a level with the surface 45 of the header part of the plug 24 and the head 35 of the electrode pins 22 and 23. As illustrated in FIG. 4, the hollow 32 is appropriately set for the groove depth h1 with respect to the thickness of a substrate 43 of the thin-film bridge 25, by which where the thin-film bridge 25 is buried, a step difference h2 between the surface of thin-film bridge 25 and the head 35 of the electrode pins 22 and 23 is made to be 1 mm or less, preferably 0.5 mm or less, more preferably 0.2 mm or less, thereby making it possible to lower a loop height h3 of wire bonding. Further, the step difference h2 is restrained as described above, thereby making it possible to easily conduct a so-called horizontal joint in which, as illustrated in FIG. 4 and FIG. 5, in a state that a wire 28 is laid down, a peripheral surface of the wire 28 is used to connect. As described above, the wire 28 is usually 1 mm or less in loop height h3, preferably 0.5 mm or less and more preferably 0.2 mm or less. Therefore, when the plug 24 into which the thin-film bridge 25 is buried is inserted into a first tubular member 29 which loads the ignition materials 26 and 27, the wire 28 can be prevented from breakage, even if a pressing force acts on the wire 28, thereby making it possible to reliably connect the electrode pins 22 and 23 with the thin-film bridge 25. The wire 28 is preferably made of gold or aluminum. Thereby, it is possible to reliably supply an electric current from the electrode pins 22 and 23 to the thin-film bridge 25. Further, the wire 28 is ordinarily made in the range from 10 μm to 500 μm in diameter, preferably from 20 μm to 500 μm and more preferably from 100 μm to 500 μm, thereby making it possible to supply an electric current from the electrode pins 22 and 23 to the thin-film bridge 25 in a more reliable manner.

As illustrated in FIG. 3 and FIG. 4, the wire 28 jointing the thin-film bridge 25 to the electrode pins 22 and 23 is connected so as to be hooked over the surfaces of electrode pads 41 and 42 on the thin-film bridge 25. In this instance, as described previously, the thin-film bridge 25 is set to a hollow 32 in a plug 24 in such a manner that the surface of the thin-film bridge 25 is kept approximately on a level with the surface 45 of the header part of the plug 24 and the head 35 of the electrode pins 22 and 23 (refer to FIG. 2 and FIG. 4), thereby making it possible to joint the wire 28 to the electrode pads 41 and 42 of the thin-film bridge 25 in a state of a so-called horizontal joint. Further, the wire 28 is connected from the electrode pad 42 to a metal part of the header part 45 of the plug 24 and therefore can be easily grounded. A description that the surface of the thin-film bridge 25 is kept approximately on a level with the surface 45 of the header part of the plug 24 and the head of the electrode pins 22 and 23 according to the present invention means that a step difference h2 in the electrode pad surfaces 41 and 42 of the thin-film bridge 25 with respect to the surface 45 of the plug 24 and the head 35 of the electrode pins 22 and 23 is 1 mm or less, preferably 0.5 mm or less and more preferably 0.2 mm or less. These electrode pads 41 and 42, which are connected by wire bonding to the electrode pins 22 and 23 by using the wire 28, are constituted with gold, aluminum, nickel, titanium or the like formed by thermal deposition or others on both surfaces of a laminated body 44 in which a reactive metal such as titanium and a reactive insulating material such as boron are laminated alternately. Reactive metals include aluminum, magnesium and zirconium, in addition to titanium. Further, reactive insulating materials include calcium, manganese and silicon, in addition to boron.

The thin-film bridge 25 may use any one of a heat element, a reactive-type bridge, in which reactive materials are used, a shock-type bridge and others. A bridge part of the thin-film bridge is formed on a Si substrate or a ceramics substrate such as $Al_2O_3$ by using known methods such as LIGA (Lithographie Galva-noformung, Abfprmung: x-ray used micro-processing technology) process or sputtering. In particular, the reactive-type bridge is preferable in that it can be activated stably by a small amount of energy.

As illustrated in FIG. 4 and FIG. 5, a reactive-type thin-film bridge 25 in a squib 10 used in a first embodiment of the gas generator according to the present invention is constituted with a bridge prepared with a laminated body 44 in which a reactive metal such as titanium formed on the surface of the substrate 43 and a reactive insulating material such as boron are alternately laminated and electrode pads 41 and 42 formed with an electric conductive material such as a metal covering the both surfaces thereof. In FIG. 3, FIG. 4, and FIG. 5, the electrode pads 41 and 42 are situated on both sides of the laminated body 44.

Reactive metals used in the laminated body 44 include aluminum, magnesium and zirconium, in addition to titanium. Further, reactive insulating materials include calcium, manganese and silicon, in addition to boron. When a thin-film bridge 25 having the above-described laminated body 44 is activated by supplying an electric current to a bridge part, the reactive metal will react with the reactive insulating material to give a hot plasma, which is then discharged. Thereafter, the plasma is able to effectively ignite an ignition material loaded therein.

A squib 10 used in the first embodiment of the gas generator according to the present invention is manufactured by the following processes.

First, as illustrated in FIG. 2, ignition materials 26 and 27 are loaded into a first tubular member 29. Then, a thin-film bridge 25 is placed at a hollow 32 of a plug 24 illustrated in FIG. 3 and FIG. 4. Further, electrode pins 22 and 23 are connected to the thin-film bridge 25 by a wire 28 by means of wire bonding. Subsequently, the plug 24 is fitted into the first tubular member 29. In this instance, even where the plug 24 is pressed to the ignition material 26 side, as described above, the thin-film bridge 25 is buried into the plug 24 and connected to the electrode pins 22 and 23 by the wire bonding in a state of a so-called horizontal joint, thereby preventing a possible breakage. Therefore, after the plug 24 is fitted into the first tubular member 29, the first tubular member 29 is inserted into a second tubular member 30 to provide an insert molding inside a squib holder 40. The thus manufactured squib 10 is favorably used in a squib and others for gas generators used in various safety systems of vehicles.

Ignition materials 26 and 27 loaded into the squib 10 preferably include those containing zirconium (Zr), tungsten (W) and potassium perchlorate ($KClO_4$) as their compositions in which fluoro rubber and cellulose nitrate are used as a binder. Further, the composition ratio (weight ratio) of zirconium to tungsten to potassium perchlorate is determined so as to be ignited easily by heat generation by the thin-film bridge 25 of the squib 10, and the ratio is preferably Zr:W:KClO$_4$=3:3.0 to 4.0:3.0 to 4.0, and more preferably Zr:W:KClO$_4$=3:3.5:3.5.

In the thus constituted squib 10, the thin-film bridge 25 is activated upon supply of electric current to the electrode pins 22 and 23, thereby making it possible to ignite the ignition materials 26 and 27 effectively in several micro seconds equivalent to 1/10 of the velocity attained by a conventional bridge wire. Further, a thermal energy generated at the thin-film bridge 25 can effectively ignite the ignition materials 26 and 27, thereby making it possible to decrease the variation of delayed ignition and the like.

In the squib 10, since the electrode pins 22 and 23 can be reliably connected by wire bonding to the thin-film bridge 25, it is also possible that, for example, an ASIC (application specific integrated circuit) or the like is placed between either of the electrode pin 22 or 23 and the thin-film bridge 25, and they are connected similarly by the wire bonding.

And, into the gas generator 1 of the first embodiment according to the present invention, as illustrated in FIG. 1, a filter member 7, gas generants 5, propellant 14 and a cushion member 15 are loaded sequentially from the other end 2 of the housing 4 and a holder 12 to which the squib 10 is crimped and fixed is inserted thereinto. A first partition member 9 may be provided between the filter member 7 and the gas generants 5 as required.

The filter member 7 is formed preferably in a rounded shape, more preferably in a columnar shape or a cylindrical shape and particularly preferably in a cylindrical shape by using an aggregate of metal wires such as stockinet wire netting, plain weave wire netting and crimp woven wire netting. The present embodiment illustrates the filter member in a rounded cylindrical shape located at the other end 2. The filter member 7 is attached so as to be in contact with a tip on the other end 2 of the housing 4. Then, the filter member 7 is pressed and fixed to the other end 2 of the housing 4 by a first partition member 9 formed with a metal, etc., and dividing the housing 4. The first partition member 9 is fixed in the housing 4 by crimping sites sandwiching the first partition member 9 of the housing 4 therebetween from the outer periphery (crimping at two sites), thereby dividing the housing 4 into a filter chamber 8 and a combustion chamber 6. A space 19 is formed so as to bore the core of the filter member 7 at the longitudinal center of filter member 7. Since chemicals such as the gas generants 5 are used at a relatively large quantity in the gas generator 1 of the present invention favorably used in inflating an airbag for side impact and the like, the first partition member 9 is favorably used to divide the housing into the filter chamber 8 and the combustion chamber 6, thereby making it possible to prevent damage of the filter member 7 resulting from combustion heat of the gas generants 5.

Propellant 14 is sealed into the combustion chamber 6. Since such a requirement is thereby eliminated that the propellant 14 is loaded into another container and assembled into the gas generator 1, it is possible to reduce the manufacturing cost and make the gas generator smaller in size. The propellant 14 is protected by a cushion member 15 so as not to be powdered due to vibration. Further, the cushion member 15 is provided with a crossed notch for reliably transmitting a force of flames from the squib 10 to the propellant 14. The cushion member 15 is preferably formed with an elastic member such as molded silicon rubber or silicon foam made of ceramic fiber and foamed silicon. The cushion member 15 is usually in a circular disk shape and preferably formed in a single layer.

The gas generants 5 are non-azide compositions, and those made of fuels, oxidizers and additives (binder, slag forming agent and combustion adjusting agent) may be used.

Fuels include, for example, nitrogen-containing compounds. Nitrogen-containing compounds include one or more types of mixtures selected from triazole derivatives, tetrazole derivatives, guanidine derivatives, azodicarbon amide derivatives, hydrazine derivatives, urea derivatives and amine complexes.

Triazole derivatives include, as specific examples, 5-oxo-1, 2,4-triazole and amino triazole. Tetrazole derivatives include, as specific examples, tetrazole, 5-aminotetrazole, aminotetrazole nitrate, nitroaminotetrazole, 5,5'-bi-1H-tetrazole, 5,5'-bi-1H-tetrazole diammonium salt and 5,5'-azotetrazole diguanidium salt. Guanidine derivatives include, as specific examples, guanidine, nitroguanidine, cyanoguanidine, triaminoguanidine nitrate, guanidine nitrate, aminoguanidine nitrate and guanidine carbonate. Azodicarbonamide derivatives include, as a specific example, azodicarbonamide. Hydrazine derivatives include, as specific examples, carbohydrazide, carbohydrazide nitrate complex, dihydrazide oxalate and hydrazine nitrate complex. Urea derivatives include, for example, biurets. Amine complexes include, for example, hexaamine copper complex, hexaamine cobalt complex, tetraamine copper complex and tetraamine zinc complex.

Of these nitrogen-containing compounds, one or more types of compounds selected from tetrazole derivatives and guanidine derivatives are preferable, and nitroguanidine, guanidine nitrate, cyanoguanidine, 5-aminotetrazole, aminoguanidine nitrate and guanidine carbonate are particularly preferable.

These nitrogen-containing compounds in the gas generants 5 are different in blend ratio, depending on the number of carbon atoms, hydrogen atoms and other atoms to be oxidized in the molecular formulae, preferably in the range from 20% by weight to 70% by weight and particularly preferably from 30% by weight to 60% by weight. Further, the nitrogen-containing compounds are different in absolute value of the blend ratio, depending on types of oxidizers to be added to the gas generants. However, the concentration of trace amount CO in generated gas will increase when an absolute value of the blend ratio in the nitrogen-containing compounds is greater than a total oxidation theoretical amount. In contrast, the concentration of trace amount $NO_x$ in the generated gas will increase when an absolute value of the blend ratio in the nitrogen-containing compounds is equal to or lower than a total oxidation theoretical amount. Most preferable is a range in which both of them are optimally balanced.

Preferable oxidizers include those selected from at least one type of cation containing nitrates, nitrites and perchlorates selected from alkaline metals, alkaline earth metals, transition metals and ammonium. Also usable are oxidizers other than nitrates, namely, nitrites and perchlorates which are frequently used in an airbag inflator field. However, since they decrease in the number of oxygen in nitrite molecules as compared with nitrate or may reduce the production of fine powder mist easily dischargeable out of the bag, nitrates are preferable. Nitrates include, for example, sodium nitrate, potassium nitrate, magnesium nitrate, strontium nitrate, phase stable ammonium nitrate and basic copper nitrate. More preferable are strontium nitrate, phase stable ammonium nitrate and basic copper nitrate.

A blend ratio of oxidizers in the gas generants 5 is different in absolute value, depending on types and quantities of nitrogen-containing compounds to be used, and preferably in the range from 30% by weight to 80% by weight. The ratio is in particular preferably in the range from 40% by weight to 75% by weight, with consideration given to the concentrations of the above-described CO and $NO_x$.

Any binders may be used as an additive as long as they do not greatly affect a combustion behavior of gas generants. Binders include, for example, organic binders such as metallic salts of carboxymethylcellulose, methylcellulose, hydroxyethylcellulose, cellulose acetate, cellulose propionate, cellulose acetate butyrate, cellulose nitrate, microcrystalline cellulose, guar gum, polyvinyl alcohol, polyacrylamide, polysaccharide derivatives (e.g., starch) and stearate, as well as inorganic binders such as molybdenum disulfide, synthetic hydroxytalcite, acid clay, talc, bentonite, diatomaceous earth, kaolin, silica and alumina.

A blend ratio of binders is preferably in the range from 0% by weight to 10% by weight for press molding and from 2% by weight to 15% by weight for extrusion molding. Molded articles will increase in breaking strength along with an increase in an added quantity of binders. However, when the number of carbon atoms and hydrogen atoms in composition is increased and the concentration of trace amount CO gas, which is an incomplete combustion product of carbon atom, is increased, the quality of generated gas is deteriorated. It is preferable to use binders in a minimum quantity because they may inhibit burning of gas generants. In particular, a quantity of binders exceeding 15% by weight may require an increase of relative abundance of oxidizers to reduce a relative percentage of gas-generating compounds, thereby making it difficult to provide a practicable gas generator system.

Further, slag forming agents may be added as a composition other than binders. The slag forming agents are added in order to facilitate filtration of a filter member 7 inside the gas generator by interactions with metallic oxides particularly generated from oxidizer compositions in gas generants.

The slag forming agents include, for examples, those selected from natural clays mainly consisting of alumino silicate such as silicon nitride, silicon carbide, acid clay, silica, bentonites and kaolins, synthetic clays such as synthetic mica, synthetic kaolinite and synthetic smectite, and talc which is a type of hydrous magnesium silicate minerals. Of these materials, acid clay and silica are preferable and acid clay is particularly preferable. A blend ratio of slag forming agents is preferably in the range from 0% by weight to 20% by weight and particularly preferably from 2% by weight to 10% by weight. An excessively large quantity of the agents will decrease the linear burning velocity and gas generation efficiency, while an excessively small quantity of them will not provide a sufficient slag forming function.

The gas generant 5 is formed by preferably combining gas generants which contain 5-aminotetrazole, strontium nitrate, synthetic hydrotalcite and silicon nitride, and those containing guanidine nitrate, strontium nitrate, basic copper nitrate and acid clay.

A combustion regulator may also be added, as required. Explosive compounds such as metallic oxide, ferrosilicon, activated carbon, graphite, hexogen, octogen and 5-oxo-3-nitro-1,2,4-triazole may be used as a combustion regulator. A blend ratio of a combustion regulator is preferably in the range from 0% by weight to 20% by weight and particularly preferably from 2% by weight to 10% by weight. An excessively large quantity of the combustion regulator will decrease the gas generation efficiency, while an excessively small quantity will not provide a sufficient burning velocity.

The above-constituted gas generant 5 is a preferably shaped article molded by press molding or extrusion molding, more preferably those molded by extrusion molding. It is available in the shape of a pellet (corresponding to a form of tablets generally used in drugs), column, tube, disk and hollow body with both ends closed. The shape of a tube includes a cylindrical shape, and the cylindrical shape includes a single-pore cylinder and a porous cylinder. The hollow body with both ends closed includes a cylindrical shape with both ends closed. Concerning the gas generants 5, a state in which molded articles of the gas generants 5 are closed at both ends is referred to as a state in which pores opened at both ends are closed by two forces from the outside to the inside. The pores may be available either in a completely closed state or an incompletely closed state.

An explanation will be made for an example of a method for manufacturing the hollow-body-shaped gas generants 5 with both ends closed. The above-described non-azide based compositions made of nitrogen-containing compounds, oxidizers, slag forming agents and binders are at first mixed by using a V-type mixer, a ball mill or others. Then, water or a solvent (for example, ethanol) is added and mixed, to obtain a mass ingredient in a wet state. In this instance, the wet state is a state having plasticity to some extent in which water or a solvent is contained preferably in the range from 10% by weight to 25% by weight and more preferably from 13% by weight to 18% by weight. Thereafter, the wet mass ingredient is, as it is, processed by using an extruder (for example, that equipped with a dice or an inner hole pin at the exit) to obtain an extrusion-molded hollow cylindrical molded article, the outer diameter of which is preferably in the range from 1.4 mm to 4 mm and more preferably from 1.5 mm to 3.5 mm, the inner diameter of which is preferably in the range from 0.3 mm to 1.2 mm and more preferably from 0.5 mm to 1.2 mm. Then, the extrusion-molded hollow cylindrical article is subjected to press molding at a certain interval to obtain a cylindrically molded article with both ends closed. Usually, the hollow cylindrical molded article is subjected to press molding at a certain interval and then cut off by folding it at the respectively closed recesses. Thereafter, the resultant is dried at two stages, namely, usually in the range from 50° C. to 60° C. for 4 hours to 10 hours and then, usually in the range from 105° C. to 120° C. for 6 hours to 10 hours, thereby making it possible to obtain cylindrically shaped gas generants having a space therein, with the ends closed. The thus obtained gas generants are usually in the range from 1.5 mm to 8 mm in length, preferably from 1.5 mm to 7 mm and more preferably from 2 mm to 6.5 mm.

Further, the gas generants are determined for linear burning velocity under constant pressure conditions. The determination is made empirically according to the following formula of Vielle.

$$r = aP^n$$

wherein r denotes linear burning velocity; a, constant number; P, pressure; n, pressure exponent. The pressure exponent n shows a gradient obtained by a logarithm plot of the pressure shown in X axis with respect to a logarithm of the burning velocity shown in Y axis.

A linear burning velocity of the gas generants is preferably in the range from 3 mm/second to 60 mm/second under 70 $kgf/cm^2$ and more preferably from 5 mm/second to 35 mm/second. Also, the pressure exponent is preferably in the range of n=0.90 or less, more preferably n=0.75 or less, and in particular preferably n=0.60 or less.

A method for determining the linear burning velocity generally includes a strand burner method, a compact motor method and a sealed pressure vessel method. More specifically, a test piece obtained by coating a restrictor on the surface after being molded to a predetermined size by press molding is used to determine the burning velocity in a high-pressure vessel by a fuse cutting method or others. In this instance, the linear burning velocity is determined with reference to the pressure inside the high pressure vessel as a variable and the pressure exponent is determined in accordance with the above formula of Vielle.

Since non-azide based gas generants are used in this instance, materials used therein are less harmful to humans. Further, a fuel component and oxidizer component are selected to keep low a calorific value per mole of generated gas, thereby making it possible to make the gas generator small in size and light in weight.

As the propellant 14, a propellant generally having the following compositions is used. Namely, the compositions containing metal powders and oxidizers, a representative example of which is $B/KNO_3$, those containing nitrogen-containing compounds/oxidizers/metal powders, and compositions similar to those of the above-described gas generants 5. The nitrogen-containing compounds include those usable as a fuel component of the gas generants (such as aminotetrazole, guanidine nitrate). The oxidizers include, for example, nitrates such as potassium nitrate, sodium nitrate and strontium nitrate. The metal powders include, for example, boron, magnesium, aluminum, magnalium (alloy of magnesium and aluminum), titanium, zirconium and tungsten. Preferable combinations include those containing 5-aminotetrazole, potassium nitrate and boron, or guanidine nitrate, potassium nitrate and boron. A molding binder may be contained in the range from 0% by weight to 10% by weight, as required.

The propellant 14 is a preferably shaped article molded by press molding or extrusion molding, more preferably that molded by extrusion molding. It is available in the shape of a pellet, column, tube, disk and hollow body with both ends closed. The shape of tube includes a cylindrical shape, and the cylindrical shape includes a single-pore cylinder and a porous cylinder. The hollow body with both ends closed includes a cylindrical shape. The propellant 14 is preferably 1 mm or greater in outer diameter. Further, the propellant is preferably from 1 to 5 mm in height.

Then, these gas generants 5 and propellant 14 are not filled into a container but individually loaded into spaces 6A and 6B divided by a plate-like second partition member 47 preferably in the combustion chamber 6. In this instance, the container is a container usually made of iron or aluminum for adding a propellant and others. The second partition member 47 includes, for example, a thin plate, a wire netting, an expanded metal and a punching metal.

Since the gas generants 5 are loaded into the space 6A and the propellant 14 is loaded into the space 6B separately, there will be no chance that they are mixed. Further, the gas generants 5 and the propellant 14 are in close contact with each other with the second partition member 47 (a thin plate is used in FIG. 1) therebetween and there develops no difference in distance between the propellant 14 and the gas generants 5 due to a difference in loading condition of the gas generants 5, thereby making it possible to stabilize the performance of gas generator 1. In addition, the thin plate used as the second partition member 47 is preferably made of aluminum, iron or SUS and in the range from 0.1 to 0.2 mm in thickness. The wire netting and the expanded metal are preferably in the range from 0.4 to 2.0 mm in thickness.

Where the second partition member 47 is not used, the propellant 14 made in a cylindrical shape is less likely to go into clearances with the gas generants 5 than when it is made in a powder or granule upon sealing the propellant 14 into the combustion chamber 6. Therefore, the propellant and the gas generants are not mixed in the combustion chamber 6 even during the transportation or after mounted on an automobile and others, there by making it possible to reliably stabilize the performance of the gas generator.

Next, an explanation will be made for operation of a gas generator 1. When a collision sensor detects collision with an automobile, the gas generator 1 will send a signal to a squib 10 to cause ignition. After a flame of the squib 10 ruptures and opens up a cushion member 15, the flame will spout into a combustion chamber 6, igniting propellant 14, forcibly igniting and burning gas generants 5, thereby generating a high temperature gas. The ignition and burning of the gas generants 5 will be transferred sequentially from the end 3 of a housing 4 to a filter member 7.

When the burning proceeds inside the combustion chamber 6 to raise an inner pressure to a predetermined level therein, a high temperature gas generated inside the combustion chamber 6 will pass through an opening 18, enter into a space 19 and pass through the filter member 7 and then the gas is made clean through the slag collection and cooling process. The thus prepared clean gas is discharged from a gas discharge opening 11.

Thereby, the sufficiently cooled clean gas discharged from the gas discharge opening 11 is directly introduced into an air belt, an airbag, etc., and inflated instantaneously.

When a thin-film bridge 25 is connected to electrode pins 22 and 23 by wire bonding, pressure of the thin-film bridge to an explosive 26 may deform and break the wire. However, in the gas generator 1 of the first embodiment according to the present invention, electrode pads 41 and 42 of the thin-film bridge 25 and a wire 28 are connected not by so-called a vertical joint in which they are connected on the end surface of the wire 28 but connected by so-called a horizontal joint in which a peripheral surface of the wire 28 is used to connect the electrode pads 41 and 42 to the wire 28, in a state that the wire 28 is laid down, thereby making it possible to connect them, with the loop height of the wire 28 kept low, even where the thin-film bridge 25 is connected to the electrode pins 22 and 23 by the wire bonding. Therefore, the wire 28 is prevented from breaking, even when a pressing force is applied to the wire.

A gas generator in which both pins are insulated from a header part 45 of a plug 24 is symmetrical in structure, and not only can the plug be fabricated in a smaller number of parts, but also the gas generator is easily manufactured and low in price. However, when static electricity is applied to a place between pins 22 and 23 and the header 45, a spark may occur on a surface where the pins 22 and 23 are in contact with an explosive of the header 45 to cause an accidental ignition. However, in the gas generator of the first embodiment according to the present invention, since at least either of the electrode pad 41 or 42 is connected to an exclusive portion of the header part 45 in the plug 24 by wire bonding and either of the pins is electrically connected to the header, no spark will occur between the pins 22 and 23 and the header 45. It is, therefore, possible to prevent an accidental ignition by static electricity or the like. Then, an ordinary bridge wire-type squib is slow in ignition time, or 800 μsec. to 900 μsec., however, according to the present invention, a thin-film bridge 25 is used at an ignition part of the squib 10 to reduce the activation time to about 50 μsec. to 300 μsec. thereby making it possible to provide a much quicker ignition than a conventional bridge wire-type squib. Thus, the gas generator of the present invention is suitable for a side airbag which requires an instantaneous ignition.

The gas generator 1 of the present invention is preferably used as a gas generator for an airbag for side impact.

Next, an explanation will be made for a gas generator 46 of a second embodiment according to the present invention with reference to FIG. 6. It is noted that in the second embodiment of the present invention, the same symbols are given to parts common to those of the gas generator 1 of the first embodiment to omit a detailed explanation.

The gas generator 46 of the present invention is different from the gas generator 1 of the first embodiment illustrated in FIG. 1 in that the other end 2 of the housing is in a flat-bottomed shape and gas discharge openings 11 are arranged axially in two lines. Despite the above arrangement, as with the gas generator 1 of the present invention, the gas generator 46 can be decreased in number of parts because the other end 2 is closed and only the one end 3 needs to be sealed. Further, the gas generator 46 can be increased in safety and made smaller in size because the sealed part is only the one end 3.

In addition, in the gas generator 46 of the present invention, gas discharge openings are arranged axially in two lines and gas generated in the housing 4 is discharged without concentration, thereby making it possible to prevent damage of a filter member 7. The filter member 7 can be used at a larger area to result in an effective use of the filter member 7.

The gas generator 46 of the present invention is also preferably used as a gas generator for an airbag for side impact.

Next, an explanation will be made for a gas generator 50 of a third embodiment according to the present invention with reference to FIG. 7. It is noted that in the third embodiment of the present invention, the same symbols are given to parts common to those of the gas generator 1 of the first embodiment to omit a detailed explanation.

In FIG. 7, the gas generator 50 is a gas generator according to the so-called hybrid inflator method, and provided with a gas cylinder 51 containing a high pressure gas, a housing 54 which houses a propellant 52 and a squib 10, an outer cylindrical member 55 which connects and holds the gas cylinder 51 and the housing 54, a filter member 57 provided along an inner periphery of the outer cylindrical member 55.

The gas cylinder 51 is made of a metal such as stainless steel or aluminum, available in a cylindrical shape having a closed end, and contracted diametrically in two stages on the opening side. Argon, helium gas and others are loaded inside the gas cylinder 51 at a quantity sufficient in inflating an airbag and the like (for example, at a quantity of 0.8 to 1.2 moles in a curtain airbag), maintained at a pressure of 20 MPa or higher, preferably at 25 MPa or higher, and an opening of the one end is sealed with a cylinder cap 63 having a rupture disk 66. The gas cylinder 51 is preferably in the range from 20 mm to 30 mm in outer diameter B.

There is no restriction on thickness of the rupture disk 66 as long as it can be ruptured by a force of flames from a squib 10. Since the rupture disk 66 is ruptured by a force of flames from the squib 10, the gas generator 50 can be made simple in structure and small in size. Further, an adiabatic expansion gas spouting from the gas cylinder 51 can be effectively heated. The rupture disk 66 is preferably in the range from 0.05 to 0.5 mm in thickness and more preferably from 0.1 to 0.3 mm.

The housing 54 is in a cup shape, having a bottom 67 and a side cylindrical part 68. A step part 53 is formed at an outer periphery of the side cylindrical part 68 in the housing 54. Further, a first flame discharging opening 58 is formed at the bottom 67, which is opened from the inside of a combustion chamber 56 to the outside. The first flame discharging opening 58 is contracted diametrically from the combustion chamber 56 toward the outside. Thereby, a force of flames is increased and spouting flames can be concentrated at the center of the rupture disk 66. Further, a metal seal tape made of aluminum or the like (not illustrated) is attached to the bottom 67 side of the first flame discharging opening 58. The seal tape prevents water and others from infiltrating into the combustion chamber 56 and also a propellant 52 housed inside the combustion chamber 56 from being dampened. The seal tape is preferably 100 μm or less in thickness and can be melted instantaneously by flames resulting from ignition of the squib 10 so as not to prevent progress of flame. Further, a plurality of second flame discharging openings 60 proceeding toward the outer cylindrical member 55 are formed at the side cylindrical part 68 of the housing 54. Therefore, flame from the squib 10 is to be discharged from the first flame discharging opening 58 and the second flame discharging openings 60 without being interrupted inside the combustion chamber 56. The second flame discharging openings 60 are usually formed in a plurality, preferably four openings are formed concentrically at the same interval. Since flames or a hot gas discharged from the second flame discharging openings 60 into a gas retaining space 59 to be described later stirs gas inside the gas retaining space 59, a cold gas discharged from the gas cylinder 51 is heated by a heat current from the housing 54 and discharged from a gas discharge opening 61 to be described later, which is provided at the outer cylindrical member 55.

A propellant 52, a first cushion member 64, a second cushion member 65 and a holder 70 are loaded sequentially inside the housing 54. A squib 10 is crimped and fixed to the holder 70. They are fixed by folding internally an opening end 71 of the housing 54 and pressing the holder 70 thereto.

The propellant 52 is usually in a donut shape (hollow cylindrical shape). A central space inside the housing 54 composed of the propellant 52, the first cushion member 64 and the second cushion member 65 forms a combustion chamber 56. The first cushion member 64 and the second cushion member 65 are made of ceramic fiber, silicon foam or the like, and available in a donut shape as with the propellant 52. These first cushion member 64 and second cushion member 65 absorb vibration transmitted to the propellant 52 so that the propellant 52 is not ruptured by vibration and others. The propellant 52 may be prepared by laminating one or two or more propellants formed in a donut shape, and granular propellants having a smaller diameter may be arranged in a donut shape.

The squib 10 and the housing 54 are arranged coaxially and opposed to the first flame discharging opening 58 formed at the bottom 67.

Further, it is preferable that the squib 10 has an inner pressure increase of 4.7 MPa or more within 3 m/sec. on ignition at a 10 cc tank. Thereby, the rupture disk 66 can be ruptured by a force of flames without fail.

The propellant 52 may include, for example, boron, potassium nitrate, 5-aminotetrazole and no-lead explosive so as to give a calorific value of 4000 J/g or greater or preferably 5500 J/g or greater. The above-described constitution makes it possible to give a calorific value of 4000 J/g or greater, preferably 5500 J/g or greater. In this instance, where a propellant is less than 4000 J/g in calorific value, a rupture disk 66 which seals the gas cylinder 51 is ruptured to cool gas discharged from the gas cylinder 51 due to an adiabatic expansion, which makes it difficult to sufficiently heat the gas. Therefore, the propellant 52 must be added in an increased quantity, resulting in a failure in making the gas generator 50 smaller in size.

The outer cylindrical member 55 is formed preferably in a cylindrical shape with a metal such as stainless steel, aluminum or the like, fitted to the housing 54 at the one end, and crimped and fixed into a step part 53 formed at the housing 54. The other end of the outer cylindrical member 55 is internally in contact with and fitted into a diametrically-contracted first step part 69 of the gas cylinder 51, and fixed by welding and others. Then, a gas retaining space 59 is formed between the rupture disk 66 and the bottom 67 of the housing 54. A filter member 57 is arranged at an outer periphery of the gas retaining space 59, namely, at an inner periphery of the outer cylindrical member 55.

The filter member 57 is formed in a cylindrical shape, so as to have an outer diameter similar to an inner diameter of the outer cylindrical member 55 by using an aggregate of metal wires such as stockinet wire netting, plain weave wire netting and crimp woven wire netting. Gas discharge openings 61 are formed at a predetermined interval around the outer cylindrical member 55 with which the filter member 57 is in contact. Further, the filter member 57 is in contact at the inner periphery with the outer periphery of the cylinder cap 63, hooked over from the gas cylinder 51 to the housing 54 and arranged so as to cover a gas retaining space 59. Thereby, any gas from the gas cylinder 51 is discharged from the gas discharge openings 61 via the filter member 57.

As described above, since the gas cylinder 51 and the housing 54 are fitted to each other and fixed by the outer cylindrical member 55 extended from the same cylinder, they are connected and held coaxially, with the axis shared by each other. Thereby, the centers of the squib 10, the first flame discharging opening 58 and the rupture disk 66 are made coaxial, and flame from the squib 10 is to hit at the center of the rupture disk 66 in a concentrated manner.

Further, since the filter member 57 is provided so as to cover an outer periphery of the gas retaining space 58 formed between the gas cylinder 51 and the housing 54, gas from the gas cylinder 51 is efficiently mixed with a high temperature gas from the housing 54 at the gas retaining space 49, and the mixed gas is discharged from the gas discharge opening 61.

Next, an explanation will be made for activation of the gas generator 50 with reference to FIG. 7. It is noted that the gas generator 50 illustrated in FIG. 7 is directly or indirectly connected to an airbag system at the axial end of the housing 54.

The gas generator 50 electrifies and ignites a squib 10, upon detection of a collision with an automobile by a collision sensor. Flame of the squib 10 ruptures the end surface 62 of the squib 10 and the flame is spouted into a combustion chamber 56 from the center of the end surface 62. The flames which have passed through the combustion chamber 56 are increased in force by narrowing a first flame discharging opening 58 and a second flame discharging opening 60 to instantaneously melt a metal seal tape provided at the outlet of the first flame discharging opening 58, strike at the center of a rupture disk 66 in a concentrated manner, and ruptures the rupture disk 66 at one burst. The gas discharged from the gas cylinder 51 via the rupture disk 66 flows into a gas retaining space 59. In this instance, the gas discharged from the gas cylinder 51 is subjected to an adiabatic expansion at the gas retaining space 59, thereby undergoing an abrupt drop in temperature. Further, the gas discharged from the gas cylinder 51 is not discharged at one burst from the gas discharge opening 61 due to the filter member 57 provided around the gas retaining space 59, but retains temporarily inside the gas retaining space 59.

Flames from the squib 10 burn a propellant 52 inside the combustion chamber 56. The resulting heat current at a high temperature is flown into the gas retaining space 59 via the first flame discharging opening 58 and mixed with gas discharged from the gas cylinder 51 and cooled. Further, the heat current strikes at the filter member 57 via the second flame discharging opening 60, and the inner wall of the outer cylindrical member 55, thereby stirring gas inside the gas retaining space 59. Therefore, the gas discharged from the gas cylinder 51 is heated to give a high temperature gas. The gas discharged from gas discharge openings 61 formed at the outer cylindrical member 55 is via the filter member 57. Thereby, an airbag connected to the gas generator 50 is inflated instantaneously by a clean gas discharged from individual gas discharge openings 61.

Since other components, in particular, the squib 10, are similar in configuration to the first embodiment, their explanation will be omitted here.

As described above, according to the gas generator 50 of the present invention, the propellant 52 is preferably 4000 J/g or greater in calorific value and more preferably 5500 J/g, thereby making it possible to decrease a loaded quantity of the propellant 52 and miniaturize the combustion chamber 56. Thereby, a distance between the rupture disk 66 and the squib 10 is made shorter and the rupture disk 66 and the squib 10 are structured so as to oppose each other, by which flames from the squib 10 can directly strike at the rupture disk 66. Therefore, as compared with a conventional case where gas generated by burning a propellant contained in a combustion chamber is used to elevate the pressure inside the combustion chamber, thereby rupturing a rupture disk, the gas generator of the present invention is able to make small the capacity of the combustion chamber.

Further, since the first gas discharge opening 58 is formed at the bottom 67 of the housing 54 so that flames generated by the squib 10 can strike at the center of the rupture disk 66 in a concentrated manner, the rupture disk 66, which is high in mechanical strength, can be ruptured by flames without fail not by resorting to mechanical means such as a piston, unlike a conventional case. Therefore, the gas generator 50 can be made simple in structure.

In addition, since the filter member 57 is hooked over so as to cover the gas retaining space 59 between the gas cylinder 51 and the housing 54, it is possible to efficiently heat gas spouting from the gas cylinder 51 and undergoing an adiabatic expansion by using a high temperature gas from the squib 10.

The gas generator 50 of the present invention according to the hybrid inflator method is suitable for inflating an airbag for side impact and a curtain airbag. In addition to these airbags, the gas generator 50 of the present invention can also be used as a safety switch for disconnecting an electric power wiring mounted on an automobile in an accident triggered by safety systems such as a seat belt pretensioner.

DESCRIPTION OF SYMBOLS

Figure 1:
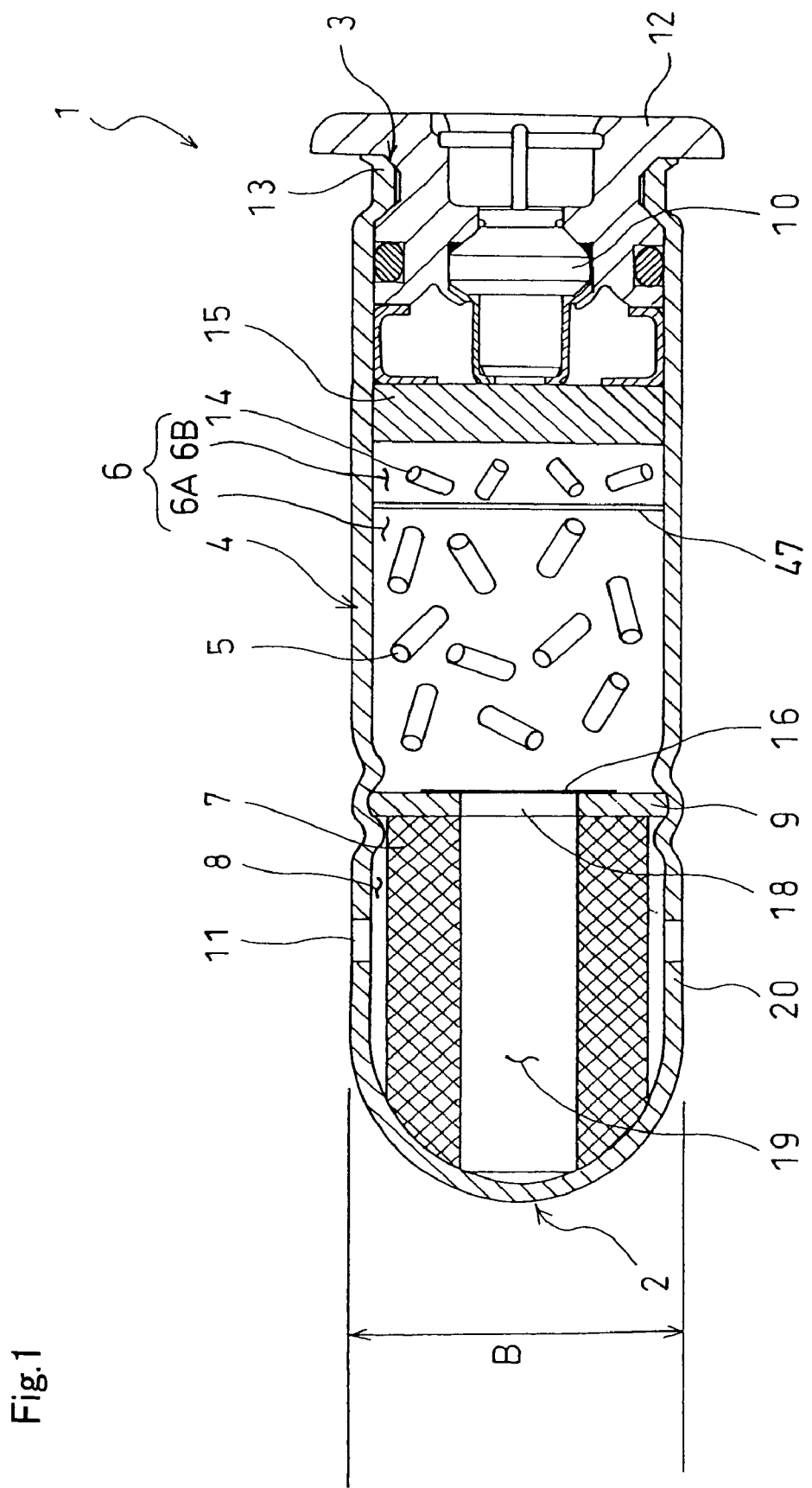
FIG. 1 is a cross-sectional view showing a first embodiment of the gas generator according to the present invention.
Figure 2:
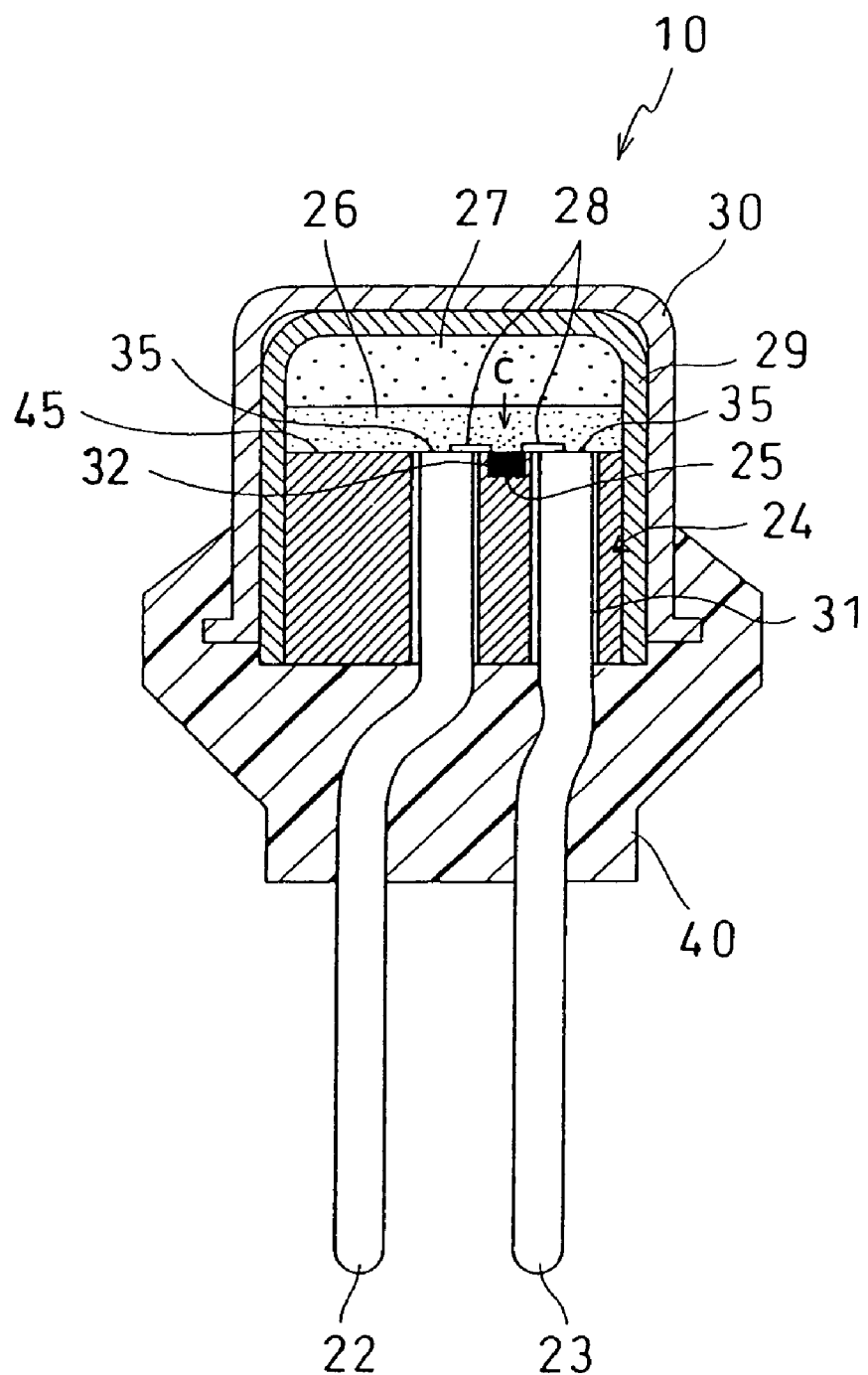
FIG. 2 is a cross-sectional view showing one example of a squib used in the gas generator of the present invention.
Figure 3:
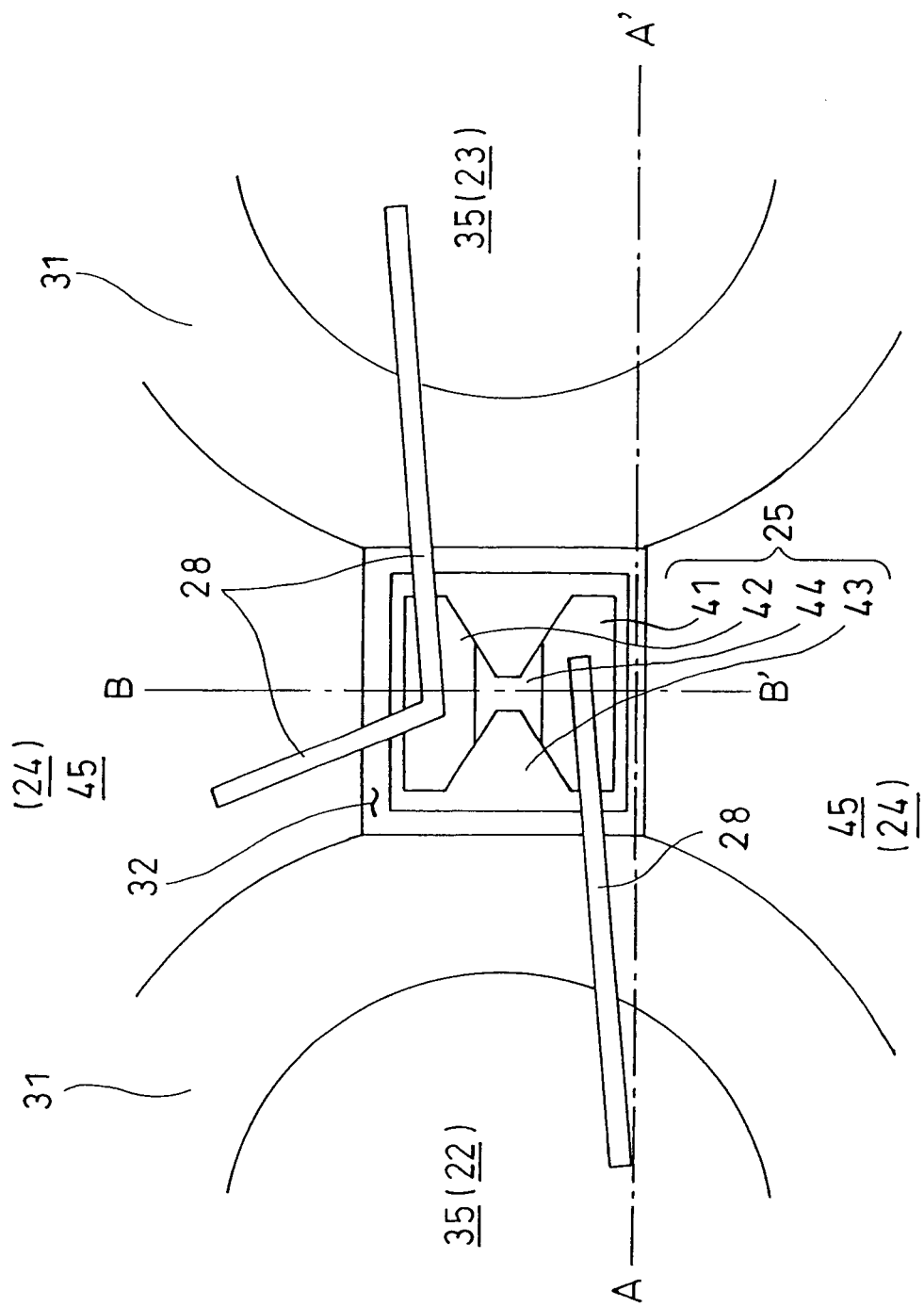
FIG. 3 is a plan view showing partially enlarged major parts in FIG. 2.
Figure 4:
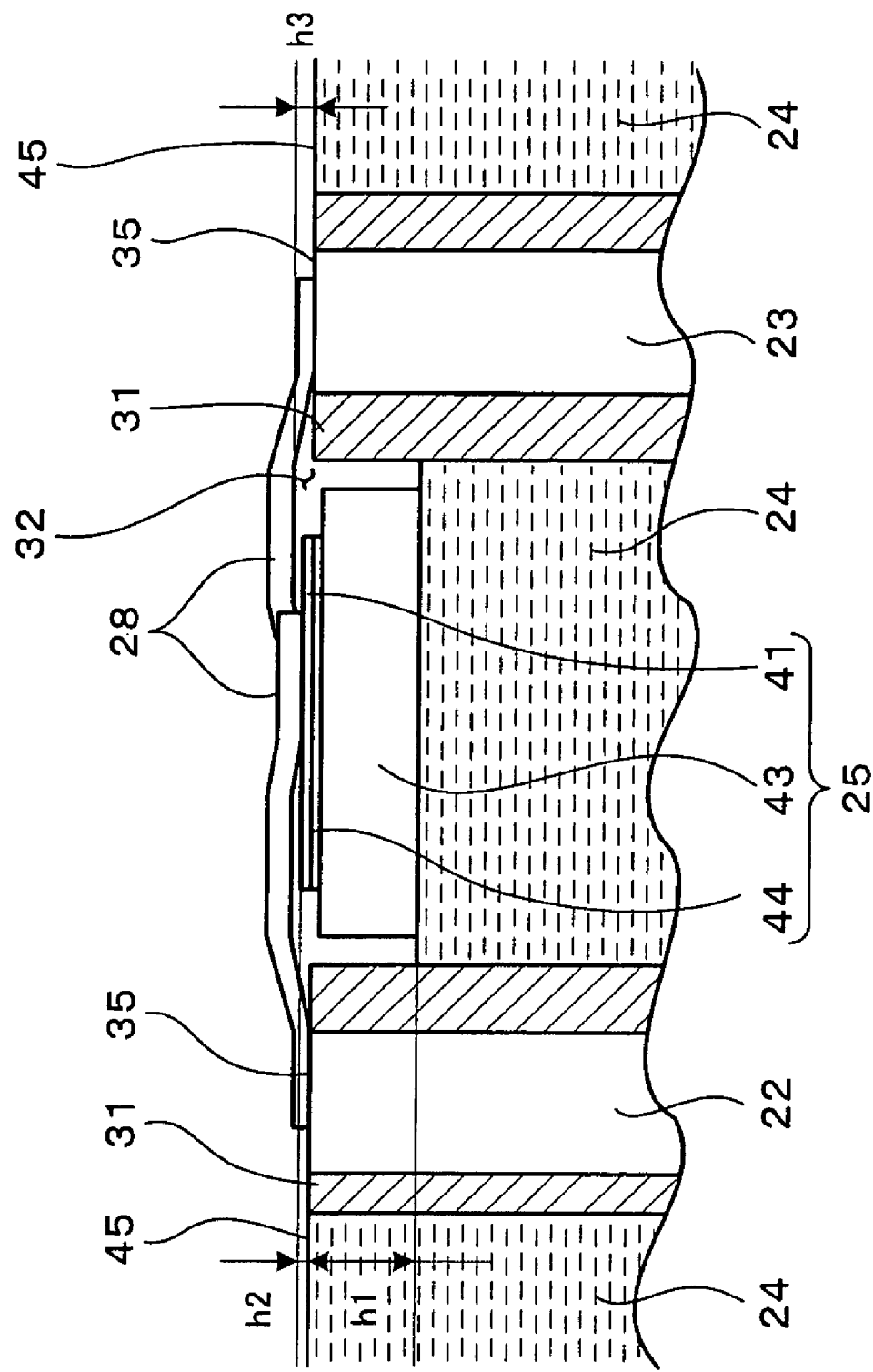
FIG. 4 is a view showing the cross section taken along line A-A' in FIG. 3.
Figure 5:
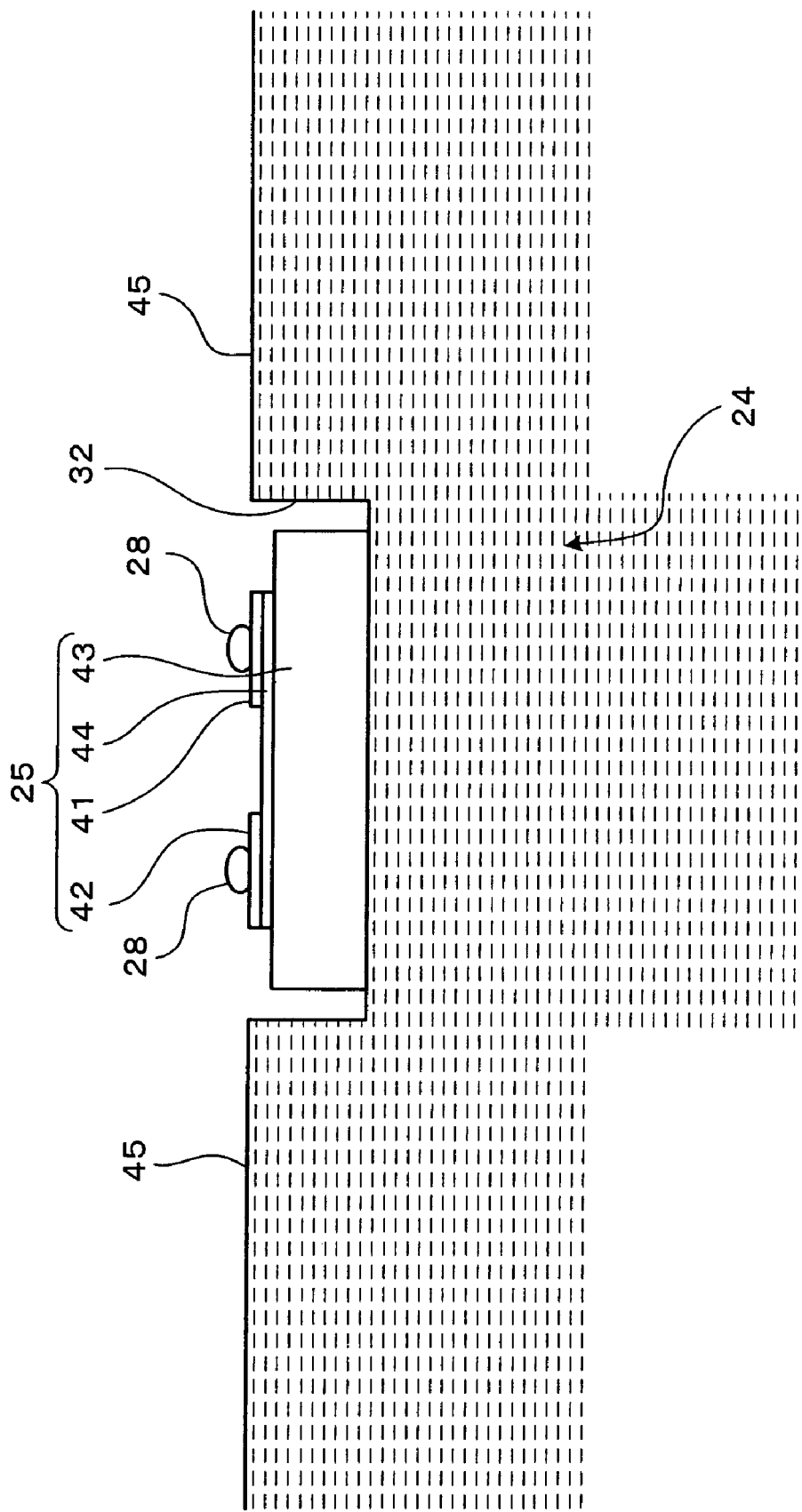
FIG. 5 is a view showing the cross section taken along line B-B' in FIG. 3.
Figure 6:
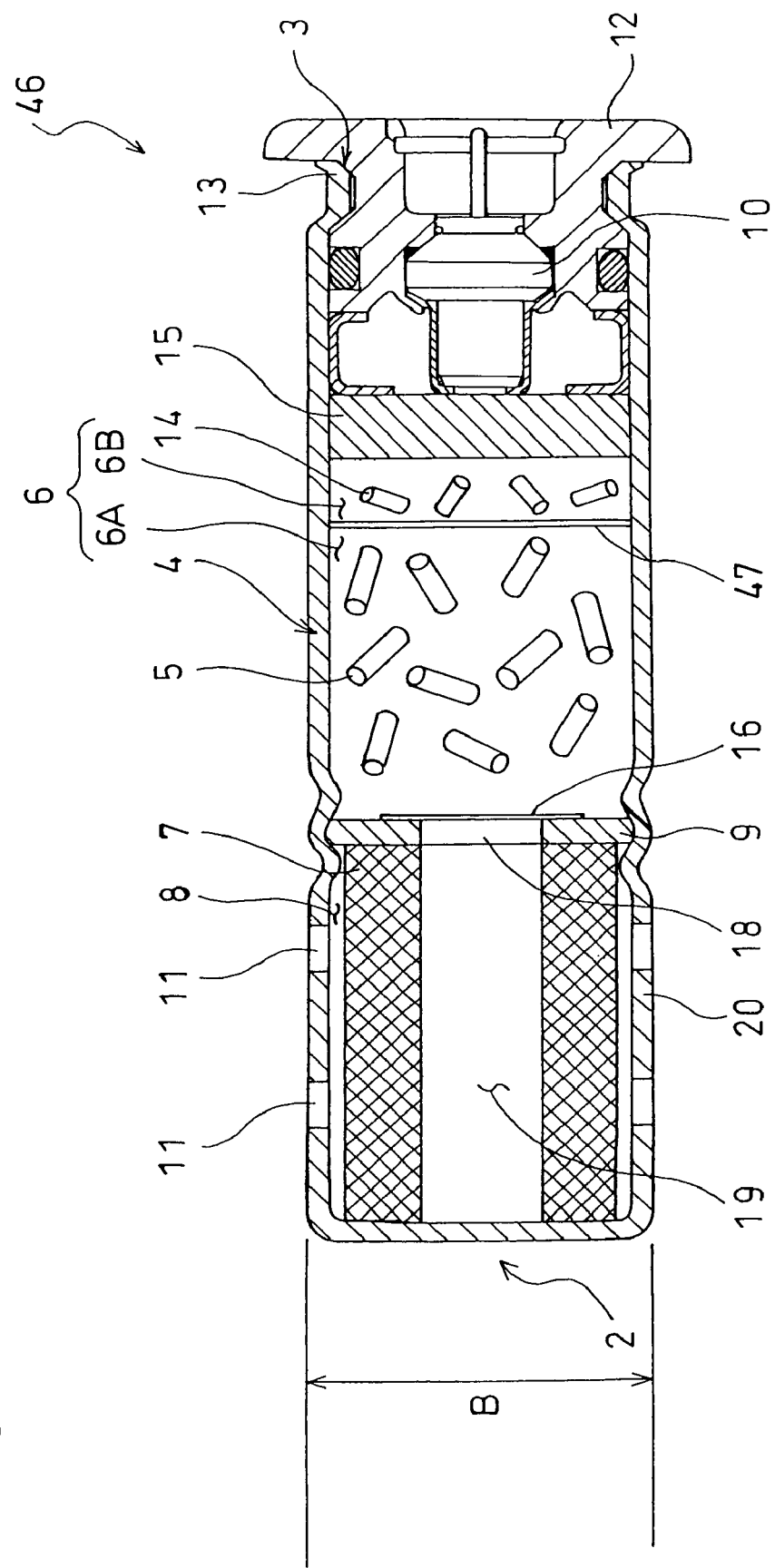
FIG. 6 is a cross-sectional view showing a second embodiment of the gas generator according to the present invention.
Figure 7:
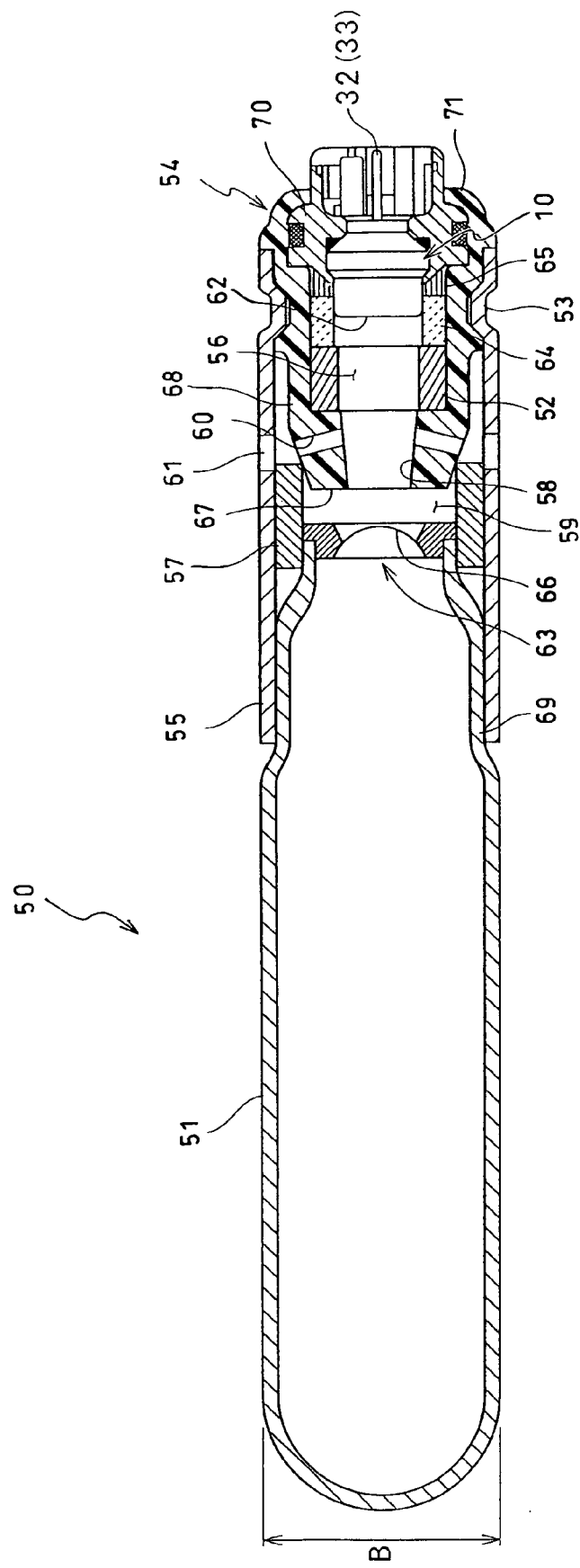
FIG. 7 is a cross-sectional view showing a third embodiment of the gas generator according to the present invention.

B: outer diameter
h1: groove depth
h2: step difference h3: loop height
1: gas generator
2: other end
3: one end
4: housing
5: gas generants
6: combustion chamber
6A, 6B: space
7: filter member
8: filter chamber
9: first partition member
10: squib
11: gas discharge opening
12: holder
13: other peripheral wall
14: propellant
15: cushion member
16: seal member
19: space
20: cylindrical part
22, 23: electrode pin
24: plug
25: thin-film bridge
26, 27: ignition material
28: wire
29: first tubular member
30: second tubular member
31: insulator
32: hollow
35: head
40: squib holder
41: electrode pad
42: electrode pad
43: substrate
44: laminated body
45: surface of header part
46: gas generator
47: second partition member
50: gas generator
51: gas cylinder
52: propellant
53: step part
54: housing
55: outer cylindrical member
56: combustion chamber
57: filter member
58: first flame discharging opening
59: gas retaining space
60: second flame discharging opening
61: gas discharge opening
62: end surface
63: cylinder cap
64: first cushion member
65: second cushion member
66: rupture disk
67: bottom
68: side cylindrical part
69: first step part
70: holder
71: opening end

What is claimed is:

1. A gas generator comprising;
   a squib having a plug having a header part and two or more electrode pins, and a thin-film bridge having electrode pads, wherein the thin-film bridge is activated to ignite ignition charge, when an electric current is supplied to the thin-film bridge via the electrode pins, the gas generator wherein the thin-film bridge of squib is arranged into a hollow prepared at the plug in such a manner that the thin-film bridge is kept approximately on a level with a head of the electrode pins and the header part of the plug, the thin-film bridge is connected by wire bonding to the electrode pins at the electrode pads, and at least either of the electrode pads or of the thin-film bridge is connected by the wire bonding to a metal part of the header part of the plug.

2. The gas generator as set forth in claim 1 further comprising a housing with at least two ends having therein a combustion chamber in which gas generants generating a high temperature gas by burning are sealed and a filter chamber to which a filter member is attached, wherein the gas generants inside the combustion chamber are ignited and burnt by the squib.

3. The gas generator as set forth in claim 2, wherein the housing is 30 mm or less in an outer diameter and the squib is attached to the one end of the housing.

4. The gas generator as set forth in claim 2 or claim 3, wherein the housing is in a closed-end cylindrical shape, which is opened at the one end and closed at the other end.

5. The gas generator as set forth in claim 2 or claim 3, which is provided with a first partition member dividing the combustion chamber and the filter chamber.

6. The gas generator as set forth in claim 2 or claim 3, wherein the other end of the housing is in a bowl shape or in a flat-bottomed shape.

7. The gas generator as set forth in claim 2 or claim 3, wherein propellant is sealed inside the combustion chamber.

8. The gas generator as set forth in claim 7; wherein the gas generants and the propellant are not loaded into a container but directly sealed into the combustion chamber, and the gas generants and the propellant are divided by a second partition member.

9. The gas generator as set forth in claim 5, wherein the first partition member is crimped and fitted into the housing from the outer peripheral end surface thereof.

10. The gas generator as set forth in claim 1, further comprising;
    a gas cylinder having therein a compressed gas,
    a housing in which a propellant and the squib are housed,
    an outer cylindrical member connecting the gas cylinder to the housing and holding them, wherein
    the gas cylinder having a rupture disk for retaining the pressure and sealing the compressed gas at the end of it facing the housing,
    the outer cylindrical member having a filter member mounted along the inner periphery of the outer cylindrical member, and
    a gas retaining space is formed between the gas cylinder inside the outer cylindrical member and the housing.

11. The gas generator as set forth in claim 10, wherein the gas cylinder is in the range from 20 mm to 30 mm in outer diameter.

12. The gas generator as set forth in claim 10 or claim 11, wherein the rupture disk is ruptured by a force of flames from the squib.

13. The gas generator as set forth in claim 10 or claim 11, wherein a plurality of flame discharging openings toward the outer cylindrical member are formed at a side cylindrical part on a bottom of the housing.

14. The gas generator as set forth in any one of claims 1, 2, 3, 8, 9, 10, or 11, wherein the surface of the electrode pads are made of any one of gold, aluminum, nickel or titanium.

15. The gas generator as set forth in any one of claims 1, 2, 3, 8, 9, 10, or 11, wherein a wire used in wire bonding is made of gold or aluminum and the wire is in the range from 10 μm to 500 μm in diameter.

16. The gas generator as set forth in any one of claims 1, 2, 3, 8, 9, 10, or 11, wherein the wire used in the wire bonding is 1 mm or less in loop height.

* * * * *